United States Patent
Schumacher et al.

Patent Number: 5,316,033
Date of Patent: May 31, 1994

[54] COUPLING FOR CONNECTING HYDRAULIC LINES

[75] Inventors: Gustav Schumacher; Friedrich W. Schumacher, both of Eichelhardt, Fed. Rep. of Germany

[73] Assignee: Gustav Schumacher, Eichelhardt, Fed. Rep. of Germany

[21] Appl. No.: 85,290

[22] Filed: Jun. 30, 1993

[30] Foreign Application Priority Data

Jul. 4, 1992 [DE] Fed. Rep. of Germany ....... 4222071
Jun. 7, 1993 [DE] Fed. Rep. of Germany ....... 4318840

[51] Int. Cl.$^5$ ............................................. F16L 37/28
[52] U.S. Cl. .............................. 137/614; 137/614.05; 137/614.06
[58] Field of Search ............... 137/614, 614.06, 614.05; 251/149.9

[56] References Cited

U.S. PATENT DOCUMENTS

| | | | |
|---|---|---|---|
| 2,675,829 | 4/1954 | Livers | 137/614.06 |
| 3,874,411 | 4/1975 | Vik | 137/614.06 |
| 4,009,729 | 3/1977 | Vik | 137/614.06 |
| 4,552,333 | 11/1985 | Niemi | 137/614.06 |
| 5,095,947 | 3/1992 | Weh et al. | 137/614.06 |

*Primary Examiner*—A. Michael Chambers
*Attorney, Agent, or Firm*—Harness, Dickey & Pierce

[57] ABSTRACT

The invention concerns a coupling for connecting hydraulic lines having a first coupling part 1 with a first valve 6, which is received into a housing 3, and including means for receiving a second coupling part 2, which includes a second valve 64. The truncated conical valve body 30 of first valve 6 is urged in the closing direction by a separate closing spring 33. Valve body 30 of first valve 6 is then penetrated by an actuator, which is adjustable in the direction of second valve 64, and which actsacross an actuating surface cooperatively with an actuating shaft 7 disposed diagonally to the valve axis and penetrates housing 3 of first coupling part 1, which actuating surface, on the one hand, acts on valve body 30 of first valve 6 and, on the other hand, on an actuator 35. The actuator 35 is urged toward actuating surface 22 by means of an opening spring 37 supported by valve body 30. In order to attain a simplified assembly, the actuating surface is part of a separate actuating member 18, which is attached non-rotatably to an actuating shaft 7, which is divided into two partial shaft pieces 8, 9.

34 Claims, 7 Drawing Sheets

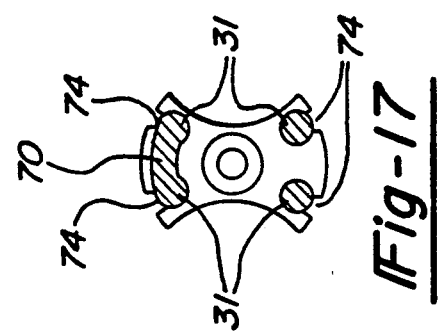
Fig-17
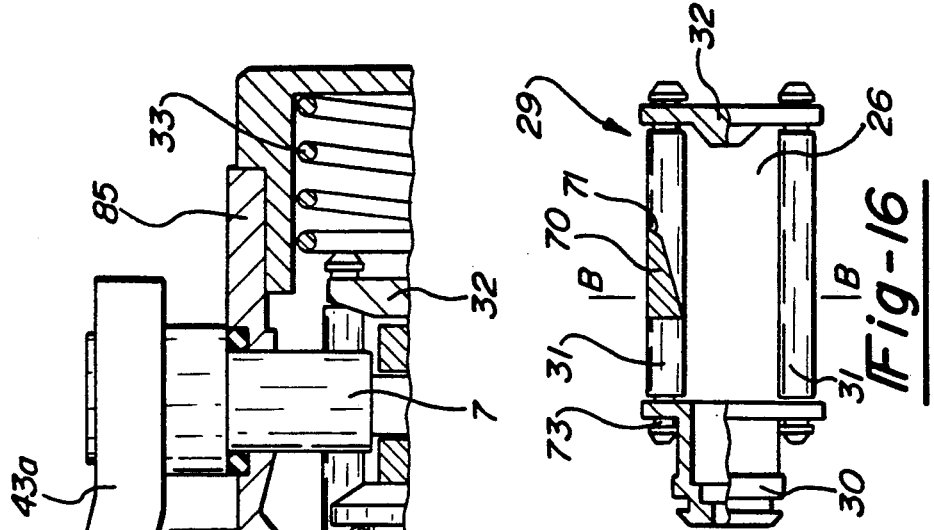
Fig-16
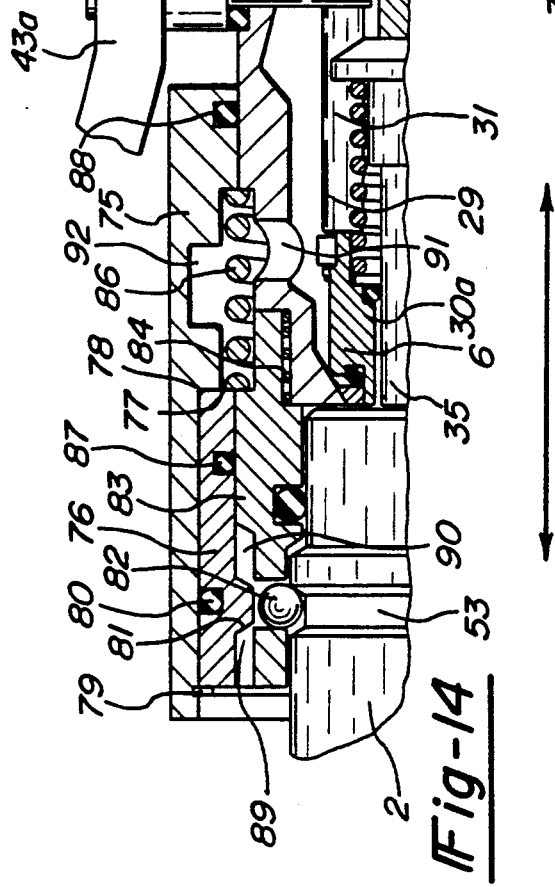
Fig-14
Fig-15

COUPLING FOR CONNECTING HYDRAULIC LINES

BACKGROUND OF THE INVENTION

The invention relates to a coupling for connecting hydraulic lines. The coupling includes a first coupling part containing a first valve which is inside a housing of the first coupling part. The first coupling part has means for receiving a second coupling part to which a second valve is added. The first valve has a valve body in the form of a truncated cone which, in its closed position, is in contact with a conical sealing surface of the housing of the first coupling part. The valve body is axially penetrated by an actuator, which is movable relative to it in the direction of the second valve. An actuator shaft is disposed transversely to the valve axis and penetrates the housing of the first coupling part. The actuating shaft acts upon the valve body of the first valve by means of actuating surfaces. The actuator is spring loaded by means of an opening spring supported at the valve body of the first valve in order to urge it toward the actuator surface.

A relevant coupling is described in DE 37 04 159 C2, issued Jun. 8, 1989. In this case, a very complicated eccentric shaft is provided, which, on the one hand, moves a sliding sleeve for the ball lock closure into the locking position, then moves an actuator, supported axially in a sleeve valve body, in the direction of the plug valve and opens it, and subsequently opens the sleeve valve body opposite to the direction of the actuator. Here, the face of the sleeve valve body directed toward the plug is constructed in such a manner that it has approximately the negative contour of the conical continuation of the plug valve extending from the plug. When connecting the plug, the conical continuation of the plug valve is directed beyond the plug receiving bore into the correspondingly shaped receptacle of the sleeve valve. Here the disadvantage is that the sleeve valve is opened and closed by means of forced guidance. The control surface of the eccentric shaft cooperates with two opposite surfaces at the valve body and a snap ring connected to it. By both, forced guidance of the valve body in both directions by way of the eccentric shaft is assured. Further, the eccentric shaft has separate control surfaces for operating the actuator in order to shift the plug valve into the open position. The operation of the actuator occurs at a time prior to the opening of the sleeve valve. The forced guidance has the effect of assuring secure closure of the sleeve valve only if the tolerances are well adhered to. The complicated eccentric shaft can, therefore, be produced only with great costs in order to maintain the required tolerances. Such a coupling is correspondingly expensive.

A further disadvantage consists in the fact that in order to assure that the sleeve valve cannot be opened when there is no plug in the coupling sleeve, considerable construction cost must be incurred in order to block the push sleeve in the open position. This is intended to assure that the eccentric shaft cannot be operated.

A further disadvantage is caused by the fact that such a coupling cannot be configured as a quick disconnect coupling. A quick disconnect coupling is of the type, if by application of a pulling force at one of the two connection points, the plug can be pulled out of the coupling sleeve without leakage of fluid from the hydraulic lines. The same applies in the case of an unintended loosening of the slide sleeve.

Quick disconnect couplings are easier to manipulate than couplings with sliding sleeves requiring the use of both hands where the sliding sleeve must be actuated by hand in order to initiate the loosening process. An advantage of the known coupling can be seen in the fact that, because of its shape, leakage during the coupling process can be kept relatively small because the surfaces of the oppositely located parts of the plug valve and the sleeve valve have narrow gaps between one another.

A further disadvantage is caused by the fact that the design requires a relative large actuation path, which amounts to approximately 180°. During the installation of the coupling, this path must be regarded as a clearance space. The coupling, therefore, requires a relatively large space for its installation.

In the case of couplings of the aforementioned type, coupling under pressure is possible since the plug valve and the sleeve valve are opened only after a completed coupling process. This is particularly important because, for example, in the area of agriculture, ever stronger implements are employed which, even after they are uncoupled, retain a counter pressure or make it necessary to maintain it. In order to utilize the many opportunities of modern hydraulics optimally, a coupling is required which can close the lines under pressure without any problems. A further requirement consists in the fact that the amount of oil leakage occurring during uncoupling must be kept as low as possible. In the case of most couplings currently in use, the amount of leakage is up to 3 cm. The same amount of air frequently enters the hydraulic system during the uncoupling process, and this has a very damaging effect on the life expectancy of valves and seals.

DE 28 23 877 B2, discloses a coupling for connecting pipe lines where the valve, belonging to the first coupling part, has a valve body which can be moved by a cam, mounted on an actuating shaft, into the open or closed position by rotating the actuating shaft. The valve body pushes, while it moves into the open position, the valve body of the second coupling part into the open position. The actuating shaft is constructed in one piece and enclosed, for part of its length, by a sleeve. This coupling is intended to connect fluid lines of tank systems and tank vehicles. It can only be used in systems where the flowing liquid is under low pressure. It is not suited for hydraulic lines because the design, consisting of the actuator shaft and the sleeve, would be blown apart because the pressure acting upon the interior faces of the sleeve and actuator shaft cannot be neutralized. The contemplated radially directed locking screws cannot withstand the pressure. Further, it is not possible to design such a coupling as a quick disconnect coupling, where the valves of both coupling parts close automatically when the coupling is disconnected, even though the actuator shaft has not been operated.

Besides the known couplings described above, which include a conical valve body, quick connect couplings are also known, in which two ball valves located behind one another on a coupling sleeve are controlled by an actuator shaft (U.S. Pat No. 3,680,591). If the actuator shaft is turned to its open position, then the sleeve valve as well as the plug valve are opened. By the forced opening a back flow protection is also provided. It is known that back flows can effect undesired closing in the case of valves which are only spring-loaded. It is a disadvantage of this coupling that, during coupling of a plug under pressure, a space in the sleeve valve exposed to pressure must be first connected to a discharge line by a corresponding positioning of the eccentric shaft, if a pressurized medium is enclosed in this space. In this case, the pressurized medium is either released as leakage or it must be allowed to flow back to the tank through a special line. Also in the case of the uncoupling process a major leak occurs because the second valve, which is also adjacent to the plug valve of the coupling sleeve, closes only after some delay so that the oil in the enclosed space can still escape before the valve is finally placed in the closed position. The use of ball valves is disadvantageous because they rely on a metal-to-metal seal and they are only absolutely tight when the seal sets are made very precisely. Especially when only a low hydraulic pressure applies a force to these valve seats, they tend toward leakages, and they tend to be dirty due to the oil leaks and the associated contamination of the environment because dust and dirt are deposited on the oil film.

For this reason, the couplings using conical valve bodies are more favorable because better sealing conditions can be achieved. Valves with conical sealing surfaces allow the installation of soft seals, which further improve the already better sealing capability of the conical seating surfaces.

SUMMARY OF THE INVENTION

The invention is, therefore, based on the task, starting from the basic coupling process, where the valve of the first coupling part and the valve of the second coupling part can be connected while under pressure and where the opening of both valves occurs only after coupling by operation of an actuator shaft, creating a coupling, which assures that the use of the essential parts is feasible for making the normal plug coupling as well as one with a self-closing effect during the disengagement process, and which can be produced at favorable costs.

In this context, the advantages of low leakage, low coupling forces, a flow through possibility in both flow directions, and closing of the valves without the need for disconnecting them are to be maintained.

The objective according to this invention is achieved in that the actuating surface is part of a separate actuating member, which is connected in a non-rotatable yet adjustable manner with the actuating shaft. The actuating shaft has two shaft parts which are axially firmly but separably connected to each other. At least one end of one of the two shaft parts is non-rotatably connected to the actuating member by a swivel nut. The two shaft parts are axially threadedly connected to each other.

Such a construction is suitable to be converted with minor changes into a coupling, which can serve as a quick disconnect coupling. The coupling design thus permits various options for the use and the configuration of the connection. This variation is made possible because the actuating surface is part of a separate actuating member, which is connected non-rotatably to the actuating shaft. By dividing the actuating shaft, the actuating member can be made correspondingly large because it is axially inserted, along with the sleeve valve body, into the sleeve housing. The actuating shaft supported with the actuating shaft parts are placed transversely in the sleeve valve body in corresponding bores after the shaft parts are put together and connected. In this manner, an especially simple assembly of actuating member and actuating shaft is achieved. Further, it assures that pressure neutralization is provided and that the threaded connection is, in a favorable manner, stressed only in tension.

Preferably the actuating member is supported between the shaft parts of the actuating shaft, non-rotatably relative to the actuator shaft and with several (but at least two) cams. One cam of the actuator member moves the actuator toward the second valve. The second cam of the actuator member moves the first valve with a corresponding turn of the actuator shaft across an operating surface into the open position.

The shaft parts can be simply axially connected to each other by a screw. Further, the two shaft parts are made concentric with each other at the ends facing each other and protrude into the housing of the first coupling part. Preferably, the actuator member is guided laterally between the two shaft parts.

The connection between the two shaft parts and the actuator member is appropriately achieved by flattening and/or contouring the ends of at least one of the shaft parts protruding into the housing of the first coupling part.

Preferably, in this case, the contoured end is provided with an oval flat or polygonal, especially a rectangular or square, cross-section.

In order to facilitate alignment of the two shaft parts during assembly, the contoured end of a portion of one of the shaft parts is formed as a male part. The male part engages a corresponding recess in the second shaft parts formed as the female part.

A further advantage of the separate construction is that the shaft parts can be given shoulders located outside the housing of the first coupling part. In each case, the shoulders form the sealing surface opposite a seal inserted in a recess in the housing. In each case, these shoulders have larger diameters than the shaft parts. They simplify the possibility for sealing the shafts.

The actuator member is preferably disposed axially between the actuating surface and the head surface of the actuator.

Such couplings should be preferably designed in such a manner that they provide different possibilities of installing and using them. Conventionally, a swivel nut is used for connecting the two coupling parts. Thus, the second coupling part is threaded to the first coupling part, or however, the attachment is made by means of locking ball closure with a sliding sleeve. Especially the latter kind of coupling is widely used and permits the installation as a fixed coupling part as well as a so-called quick disconnect coupling.

In a fixed installation, the housing of the first coupling part is placed in a fixed location. If the second coupling part is to be connected, an outer slide sleeve at the first or second coupling part is displaced against the force of a spring in such a manner that a number of locking balls, held radially in a cage, can move toward the outside. If the corresponding coupling part is inserted with its locking groove to the level of the locking balls, then the balls snap into a circumferential groove when the sliding sleeve is pushed again by the force of a spring into a locking position. In this process, the locking balls are retained in the locking groove. For such a coupling, an embodiment can also be chosen in such a way, that not the housing but the sliding sleeve is positioned in a fixed location, while the housing proper, with the recess formed by it, can be pushed forward or backward through a limited axial distance against the force of a spring. The spring is installed in such a manner that its double-acting force always urges the housing against the sliding sleeve for the lock balls in the locking position. The coupling process, in this case, is very easily handled. The plug is simply pushed in for coupling and pulled out for uncoupling.

To provide a further concrete example, a solution is, therefore, proposed, which also makes the opportunity for the design as a quick disconnect feasible without requiring major changes of the basic parts.

As a further embodiment of the invention, the actuating member with the double cam, which is configured as a disk, may have a basic elliptical or oval form, where the circumferential surface serves as the actuating surface. In principle, the actuating member must have two symmetrically shaped cams in order to actuate, on the one hand, the actuator and, on the other hand, the valve body of the first valve. Such a design provides the opportunity to create an opening or closing path of about 90°. In order to provide a defined opening position, it is contemplated that the ends of the elliptical actuating member be flattened relative to the major axis.

For dimensioning the basic shape of the actuating member it is contemplated that the major axis (longitudinal axis) of the actuating member will be greater than the minor axis (lateral axis) by at least the sum of the opening paths of the plug valve and the sleeve valve.

In further actualizing the design of the coupling as a quick disconnect coupling, it is contemplated that the actuating member is to be provided with a longitudinal hole on its major axis (longitudinal axis), by means of which it is to be rendered non-rotatable on the actuating shaft, which is provided with two cross-sectional parallel guide surfaces, but is adjustable in the direction of the major axis (longitudinal axis).

Hereby, a relative adjustment of the actuating member is provided with regard to the actuating shaft, which is fixed in position in the housing of the first coupling part.

For the embodiment as a quick disconnect coupling, it is preferred to provide the elongated hole in the actuating member in such a manner that it can be adjusted along the longitudinal axis in one direction from a center location to an off-center location.

According to a preferred embodiment, the operating surface will be a part of a carrier to which the body of the first valve is fastened and the closing spring will exert a force against the carrier. Hereby, a simple design is achieved, because both parts can be made separately. However, a one-piece design of the carrier and the valve body of the first valve is also possible.

Preferably, the carrier forms a guide space into which the actuator protrudes and in which the actuator is pivotably received and which is penetrated by the actuating shaft disposed transversely to the valve axis. A particularly simple design results if the carrier is constructed from shafts attached to the valve body parallel to the valve axis, and of a face plate attached to their free ends, which includes the operating surface toward the actuating member, whereby the actuating member is guided between the shafts.

The diameters of the shafts can be chosen in such a way that they provide the guidance toward the outside in the housing of the first coupling part and that, in each case, a slot is formed between the shafts, one of which serves to guide the actuating member and the other to provide a passage for the actuating shaft. Grooves are provided at each end of the shaft. The grooves allow the shafts to be inserted, at one end, into corresponding slots of the first valve, and at the other end, into corresponding slots of the face plate. The design can be constructed very cost effectively from turned parts. Because considerable radial forces act on the actuator during the actuation process, especially during the opening of the first valve and the second valve against pressure, the four shafts are suitable for guiding the actuator. It can, for example, be designed with a head, which is located between the shafts.

In order to be able to turn back the actuating member into its embodiment as a quick disconnect coupling, if, for example, it has shifted relative to the actuating shaft when the plug had been pulled away and the actuating shaft was in the open position, it is contemplated to design the bore diameter of the housing of the first coupling part in such a manner that it initially grows larger at a certain angle and then becomes smaller again.

In the case of a one-piece construction of the carrier, where the valve body assumes the shape of a tubular projection, two pairs of slots are planned for the radial passage of the actuation member and the actuating shaft which are extended in an axial direction and are diametrically opposite each other. The actuating shaft is guided through one of these pairs of slots. The pair of slots which is displaced by 90° for this purpose serves to guide the actuating member.

The two slots of the second pair of slots for guiding the actuating member can have different lengths. Hereby, the direction of rotation for turning the actuating shaft into the open position or the closed position can be predetermined. This makes it unnecessary to provide for exterior stops and facilitates the possibility of adapting the rotary lever for operating the actuating shaft to be assembled to the coupling. It provides the possibility of attachment in various angular orientations in order to utilize the available free space.

In designing the carrier for the valve body of the first valve, it can be of particular advantage if a stop is provided between the two shafts of the carrier. The stop limits the opening path in one direction, and in the opposite rotational direction the closing path to about 90°.

It is further proposed that the valve body of the first valve be spring loaded by means of a separate closing spring, which is supported by the housing of the first coupling part or by a part attached to it and which spring exerts a force in the direction of the closed position. The actuating surface in the closed position of the first valve is provided with a passage to the operating surface in order to move the valve body of the first valve into the open position.

It is advantageous in the case of this design, that even after wear or in the case of excessive tolerances, a secure closure of the first valve is always assured. Closure occurs due to the spring force, and beyond this, in the context of the passage, even after wear has occurred.

If this principle is to be realized also with a coupling with a quick disconnect function, it is contemplated that the actuating member in the open position can be moved in the direction of the valve shaft by at least the valve stroke of the valve body of the first valve from the closed position to the open position relative to the actuating shaft, which is increased by at least the size of the passage.

The opening path of the actuator is of such a dimension that it can be moved into the receiving space to receive the plug of the coupling sleeve in order to open the second valve beyond the face of the housing of the first coupling part by at least the opening path length of the plug valve.

The coupling is particularly suitable for being designed in such a manner that it is appropriate for connections according to ISO-Standard ISO 5675 as well as for SAE Standard SAE-J 1036. In such an embodiment, the shaft of the second valve protrudes forwardly beyond the face of the second coupling part. Further, couplings with elongated flat valve plugs as second coupling parts are possible for the same receiving parts. In this case, the term flat valve plug refers to a plug the valve body of which does not protrude beyond the face of the housing of the related coupling part.

In order to reduce the oil leakages in the case of the above mentioned plugs, which comply with the standards, an additional filler ring of an appropriate material can be placed in the recess. This can reduce the oil leakage losses to about 0.3 cm during uncoupling. Instead of a design with a quick connect locking feature, the coupling can also be constructed as a threaded coupling. In this case as well, the receiving space for the threaded plugs is provided with valve parts which ar elongated by the opening path of the second valve. It is, however, also possible to design the receiving space in such a way, that the face of the first valve body has a receiving contour, i.e. a recess for the valve elongation of the projection protruding from the face of the second coupling part. In the case of such receiving spaces, it is, however, not possible to use adapted flat valve plugs as an alternative, because the actuator selected is shorter by the opening path of the valve.

The passage chosen according to the embodiment according to the invention can further be of such a dimension that the valve to be inserted is opened with a certain pre-travel prior to the valve containing the recess. Accordingly, the distance from the actuating surface to the operating surface must be greater by the amount of the distance from the rear face plate to the front face plate of the first valve. If the actuating shaft is now turned, then the actuating member pushes the first actuator in the direction of the second coupling part and only then does the actuating member push the rear face plate of the valve body of the first valve in the opposite direction and opens the first valve.

In addition, a blocking feature may be provided so that in the case of opened valves, uncoupling them is not possible. For this purpose, an external shoulder of a actuator shaft part can be oval-shaped. In an elongated portion of the locking sleeve of the coupling bushing an elongated hole with additional curved openings is present. The elongated hole, in this case, has a length, which is composed of the length of the longitudinal axis of the oval shoulder and twice the coupling path of the coupling. If the actuating shaft is then, after it is engaged, rotated by 90°, the longitudinal axis of the oval shoulder is turned into the recesses in the sides of the elongated hole and holds the sliding sleeve in place relative to the coupling bushing. By virtue of this device, no coupling or uncoupling can occur when the coupling is open.

In order to facilitate the coupling process even when the line connection to the first coupling part is under pressure, it is contemplated to add to the first coupling part a pilot operated check valve. The check valve is located between the line connection of the first coupling part to a high pressure line and the actuating member and it can be placed into the open position by moving the actuating member.

In this case it is not necessary to actuate the control valve that is normally present in the connection to the line connector for release purposes. As a concrete version of this embodiment, it is proposed to make the check valve operable by means of a carrier supported by the actuating member.

The application of the design principles is possible for two basic embodiments. Thus, in a first embodiment, it can be contemplated that the first coupling part may be a coupling sleeve and the second coupling part may be a coupling plug. Alternatively, it is contemplated that the first coupling part is designed as a coupling plug and the second coupling part as a coupling sleeve.

From the following detailed description taken in conjunction with the accompanying drawings and subjoined claims, other objects and advantages of the present invention will become apparent to those skilled in the art.

BRIEF DESCRIPTION OF THE DRAWINGS

Examples of preferred embodiments of the invention are shown schematically in the drawings.

FIG. 14 is a longitudinal sectional view as a partial half-section, through another embodiment of the coupling, which is designed as a quick disconnect coupling, however, with a radial connection to the pressurized medium.

FIG. 15 is a cross sectional view of the embodiment of a valve body of the first valve with the carrier in the form of a one-part component with axial slots for the actuating shaft and the actuating member.

FIG. 16 is a plan view partially in section of a preferred embodiment of the valve body of the first valve with the carrier designed as shafts and a face plate for connecting the shafts.

FIG. 17 is a cross-sectional view of FIG. 16 along the line 17—17 thereof.

DETAILED DESCRIPTION OF THE PREFERRED EMBODIMENTS

Figure 1:
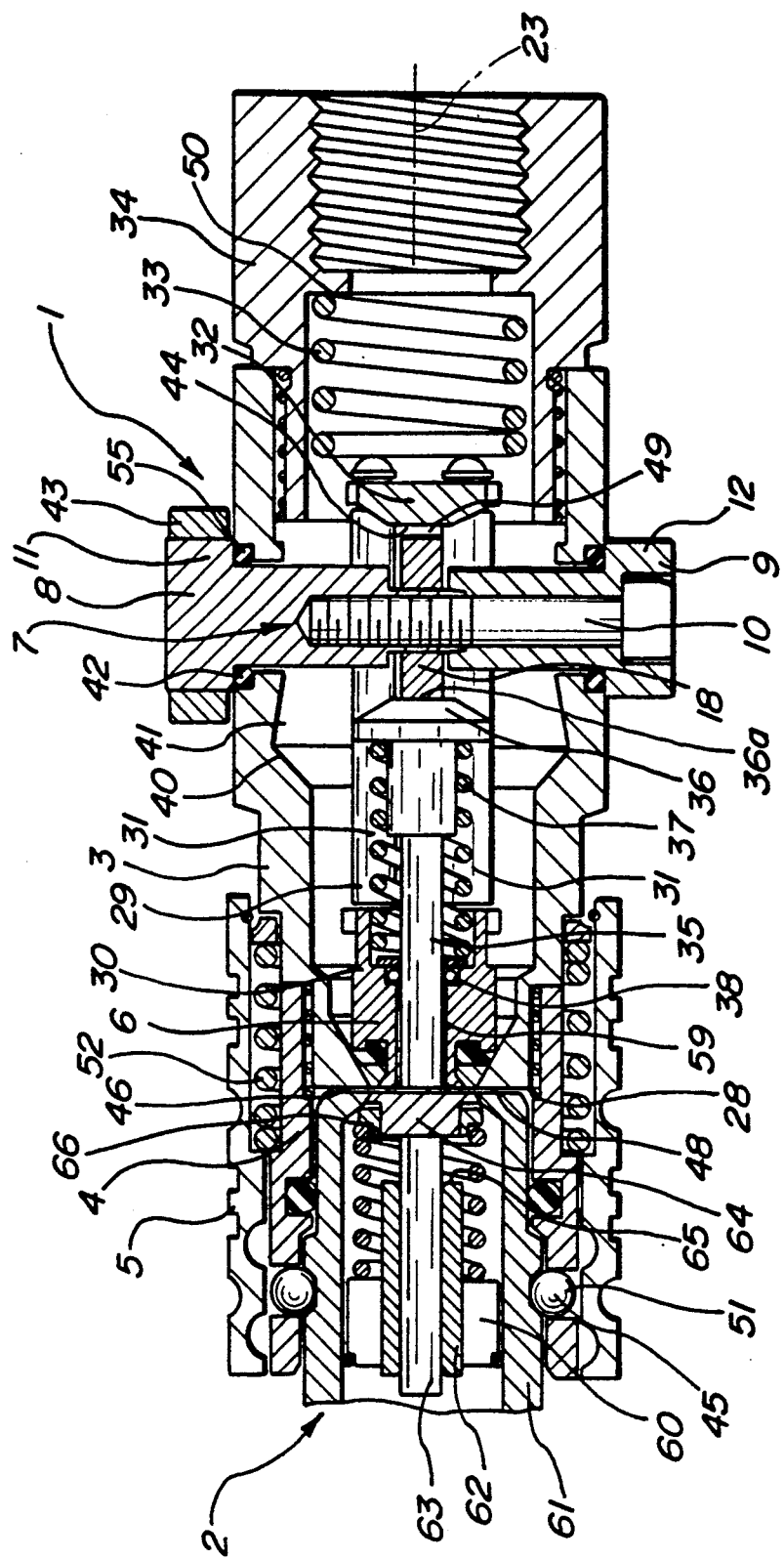
FIG. 1 is a longitudinal sectional view of a coupling of a first embodiment in the plane which contains the axis of the actuating shaft and an adapted flat plug, with the first and second valves in the closed position.

The coupling shown in FIGS. 1 to 4 includes a first coupling part 1 constructed as a coupling sleeve and second coupling part 2 constructed as a plug. First coupling part 1 includes a housing 3, receptacle 4, relative to it, axially movable locking sleeve 5, first valve 6 and the actuating means which include actuating shaft 7. Receptacle 4 is threadedly connected to housing 3. Actuating shaft 7 includes two shaft parts 8 and 9, which are threadedly connected to each other by a screw 10. The two shaft parts 8, 9 each have an outer collar 11, 12 respectively. An end of the actuating shaft part 8, 9 is flattened or contoured. The flat portion 13 is more closely recognizable in FIGS. 9 and 10 and explained on that basis.

Figure 7:
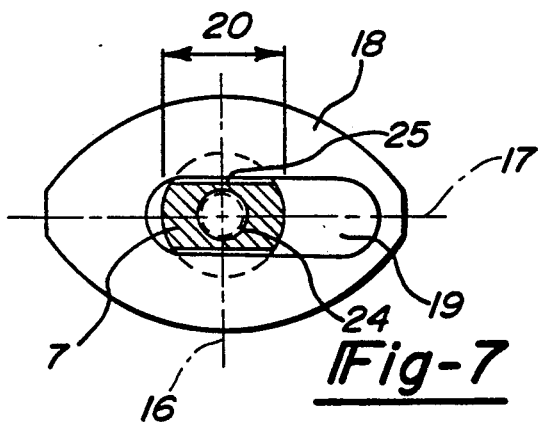
FIG. 7 is a detailed plan view in section of a preferred embodiment of an actuating member for the design as a quick disconnect coupling.
Figure 8:
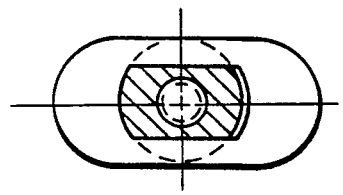
FIG. 8 is a plan view partially in section of an actuating member for couplings which are not intended for use as quick disconnect couplings.
Figure 11:
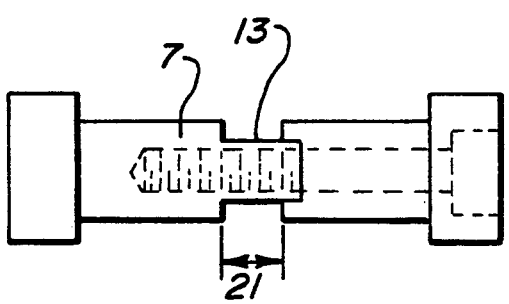

On the flattened portion 13 there is non-rotatably supported an actuating member 18 (FIGS. 7 and 8). This actuating member 18 has a preferably elliptical basic shape with minor axis 16 and major axis 17 (FIG. 8). For couplings which are not used as quick disconnect couplings, actuating member 18 can be non-slidable, as shown in FIG. 8, and non-rotatable on actuating shaft 7. For couplings functioning as quick disconnect couplings, actuating member 18 (FIG. 7) has an elongated hole 19 for the non-rotatable support. This elongated hole (19) is longer than dimension 20 (FIG. 12) of flattened portion 13 of shaft part 8 by at least the closing path and passage 49. The thickness of actuating member 18 is smaller, a desired amount, than distance 21 of the flattened portion 13, when the two parts 8 and 9 of actuating shaft 7 are axially connected firmly and concentrically by screw 10 (FIG. 11). Thus, actuating member 18 can shift on actuating shaft 7 in its axial direction 17 by the amount by which elongated hole 19 is longer than dimension 20 of shaft range 13 (FIG. 7).

First valve 6 of first coupling 1 includes valve body 30 and carrier 29, which is constructed from the four shafts 31 (in the sectional drawings only two pieces are shown in each case) and rear face plate 32. Closing spring 33 is supported at one end by a shoulder 50 of connection 34 and pushes valve body 30 of the first valve in direction A and thus toward the closed position by means of shafts 31. In bore 59 of valve body 30, actuator 35 is axially guided. This actuator 35 is a preformed part with ranges of varying diameters and with head 36 and head surface 36a. Actuator 35 is held against actuating member 18 by opening spring 37, one of the ends of which is supported by valve body 30.

Head 36 of actuator 35 is guided into guide space 26 (FIG. 16), which is located between the four shafts 31 of carrier 29, and its shaft is sealed against valve body 30 by seal 38. The diameter of bore 57 of housing 3 is enlarged in direction A before actuating shaft 7 by a given angle 40, and it is reduced in diameter toward actuating shaft 7 by a given angle 41. This change in diameter is, as described below, necessary for the function of actuating member 18.

Shaft parts 8 and 9 are sealed against housing 3 by seals 42, which have been placed in a recess 55 of the housing 3 and seal against the shoulder 11 or 12 of shaft parts 8, 9. This design of a shaft seal is particularly simple and space saving.

The actuator handle 43 is attached to shoulder 11. Instead of actuator handle 43, a rotary key can also be used for actuating the coupling if the shoulder 11 is designed accordingly.

Receiving portion 4 is, according to FIG. 1, constructed for the second coupling part designed as a flat valve plug, which is shown, as well as for plugs designed according to ISO-Standard 5675 and SAE-J-Standard 1036. It is for this purpose, that receptacle 4, from lock ball line 45 to head surface 46 of valve body 30, or, as the case may be, to face 28 of housing 3, is longer by the amount by which valve continuation 47 (FIG. 2) of second valve 64 protrudes from face 48 of second coupling part 2a.

A second coupling part 2, on the other hand, is longer from line 45 to its face 48 also by the amount represented by valve continuation 47. If designed in this manner, plugs according to ISO- or SAE-Standards can be used for receptacle 4, as well as specially fitted second coupling parts 2 (FIG. 1) configured as plugs.

Lock balls 51 retain second coupling part 2 or 2a in a known manner in receptacle 4. Locking sleeve 5 locks or unlocks balls 51 also in a known manner and is, therefore, not described any more precisely.

If housing 3 of first coupling part 1 is placed in a fixed location, then coupling or uncoupling is effected by shifting locking sleeve 5 manually against the force of spring 52 relative to housing 3 and receptacle 4.

In its embodiment as a quick disconnect coupling, locking sleeve 5 is placed in a fixed position, where housing 3 with receptacle 4 can be moved axially by the amount necessary for the displacement of locking balls 51 in the unlocking grooves in locking sleeve 5. Because this function is known, it will not be addressed any further.

Figure 2:
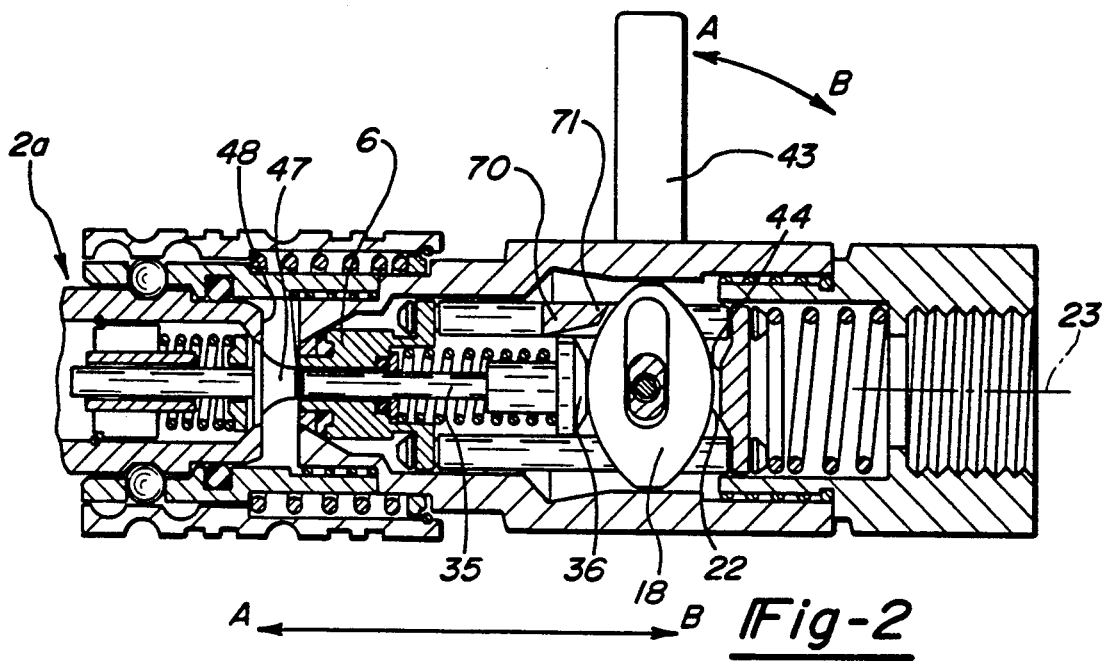
FIG. 2 is a longitudinal sectional view with a longitudinal axis, which has been rotated by 90° relative to FIG. 1, however, containing a plug according to ISO 5675 or SAE-J 1036-Standard, likewise in the closed actuating position.

FIGS. 1 and 2 show the coupling according to the invention in the closed actuating position and with an actuating member 18, which is designed as a self-closing first valve 6 of first coupling part 1. For non-self-closing valves 6 it is sufficient, as was mentioned, to use an actuating member according to FIG. 8. The coupling parts 2a, designed as plugs according to ISO- and SAE-Standards, as well as the adapted and constructed as a flat plug second coupling part 2, have a second valve 64 with an opening path limited by a stop.

Figure 3:
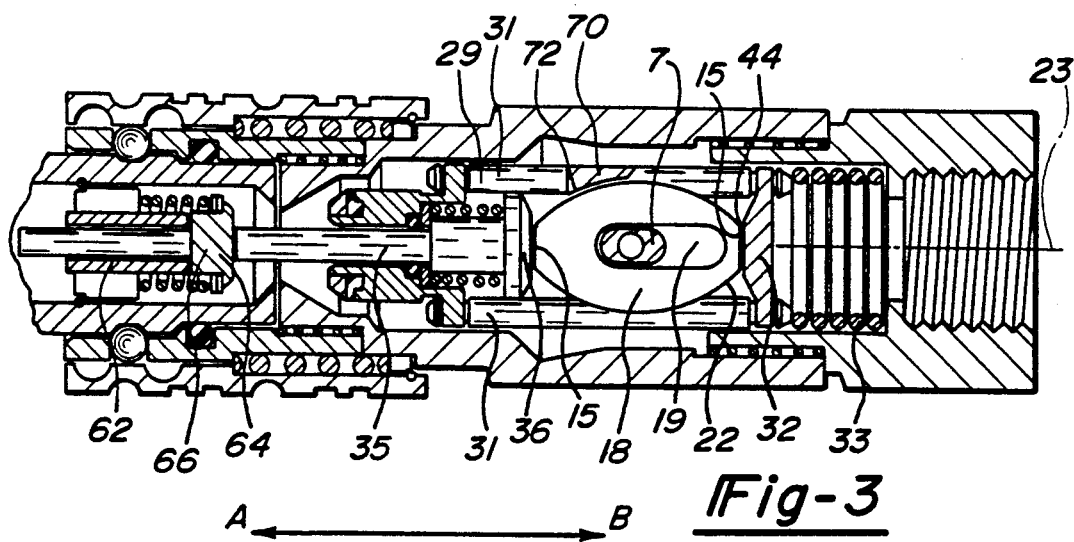
FIG. 3 is a longitudinal sectional view in a plane, which has been rotated by 90° in its longitudinal axis relative to FIG. 1, with first and second valves in the open position.

Here, star-shaped body 60 of second valve 64 in housing 61 of the second coupling part is axially held in place by appropriate means. In sleeve 62 of star-shaped body 60, shaft 63 of second valve 64 is supported in an axially slidable manner. The distance between sleeve end 65 and valve plate 66 determines the possible opening path of second valve 64. In the open position, the plug valve is, therefore, located at sleeve 62 of star shaped body 60. FIG. 3 shows the coupling according to FIG. 1, in a section displaced by 90° and in the open actuation position.

If actuating shaft 7 (FIG. 1) is rotated by 90°, actuating member 18 is also rotated by 90° by means of flattened portion 13. Major axis 17 (FIG. 7) of actuating member 18 acts here in an axial direction (in the direction of valve shaft 23) of first valve 6, and has now moved actuator 35 in direction A and rear face plate 32 with carrier 29 in direction B.

Actuator 35 has now opened second valve 64 far enough, that valve plate 66 of second valve 64 is placed against sleeve 62 of star-shaped body 60. In this actuating position, actuating shaft 7 is in the middle of actuating member 18 and elongated hole 19, located in it, is displaced from the center and moved in direction B. Because actuator 35 cannot be moved any further in direction A, since valve plate 66 is located at sleeve 62, which is axially held in place, first valve 6, which is pulled from rear face plate 32 in direction B by way of shafts 31 due to the fact that operating surface 44 of actuating surface 22 of actuating member 18 is positioned against it, has also been opened. Actuating member 18 with its elongated hole 19, only separated by certain passage, is now positioned against actuating shaft 7. Thus, first valve 6 can not move further in direction B. Thus, the coupling is protected against reverse flow, because neither the valve of the first nor that of the second coupling part can be crushed by the flow of media. Through-flow in both flow directions is possible.

If now, for example in the case of a coupling installed as a quick disconnect coupling, second coupling part 2 or 2a is disconnected without first closing the coupling, the axial resistance of second valve 64 against actuator 35 is eliminated, and closure spring 33 pushes valve body 30 of first valve 6, by way of carrier 29, in direction A and thus places valve 6 in the closed position. At the same time, actuating member 18 in elongated hole 19 is likewise pushed in direction A by means of face plate 32. The valve position of FIG. 4, with closed first valve 6 and actuator 35 protruding into receptacle 58, is established.

In this position, renewed coupling is only possible with a non-pressurized second coupling part 2, 2a. Even then, however, the coupling force is considerably higher than in the closed coupling position, because the force of closing spring 33 must additionally be overcome, since actuator 35 now pushes face plate 32, by way of actuating member 18 and thus carrier 29, in direction B when a plug is inserted into receptacle 58.

When actuator shaft 7 is turned into the closing position, actuating member 18 is eccentric with respect to actuator shaft 7 and must be returned to its centered position in elongated hole 19, because the length of the longitudinal axis of actuating member 18 corresponds approximately to the inner diameter of cylindrical bore 57 of housing 3 of first coupling part 1. In order to make this possible during the actuating process, an increasing or decreasing diameter enlargement 56 with angles 40 and 41 is required. The number of degrees of the angle depends on the shape of actuating member 18.

While the coupling is being opened, the elongated hole 19 at actuating member 18 has to point to the rear, thus in direction B. In order to avoid turning the coupling in the wrong rotational direction, it is necessary to provide for corresponding stops. These stops are provided for carrier 29 of valve body 30 of first valve 6 and preferably disposed at or between shafts 31 (FIG. 16 and 17). Thus, the angular position of actuating handle 43 relative to actuating shaft 7 can be freely chosen. This is especially advantageous, if the space for the installation of the coupling on the corresponding equipment is limited or can not be chosen at will. It may also be necessary, depending on the installation position of the coupling, to attach the actuating lever optionally on one of the partial shaft pieces 8 or 9. In this case, the coupling can either be opened in a clockwise direction and closed in a counter clockwise direction or in the opposite sequence. For this reason, a stop outside the coupling sleeve is not advantageous.

The configuration of the stops in the case of a carrier consisting of shafts 31 can be seen in FIGS. 16, 17. There are two shafts 31 of the valve body of the first coupling part connected to each other by a bridge 70 which functions as a stop.

Bridge 70 is constructed in such a manner, that actuating member 18 can only be turned forward in one direction and turned rearward in the opposite direction. Therefore, it is not possible according to FIG. 2 to turn actuating handle 43 any further in direction A, because actuating handle 18 would then hit against stop 71 of bridge 70. Actuating handle 43 can, therefore, be turned only in direction B, and thus elongated hole 19 can likewise be turned rearwardly in direction B. On the other hand, it is not possible, to turn actuating member 18 by more than 90° because, as shown in FIG. 3, it then touches edge 72 of bridge 70.

The coupling according to the invention as shown in FIG. 1, 2, 3 and 4 has, as described, an elongated recess, in order to employ, on the one hand, a second coupling part in the form of a plug according to ISO-Standard 5675 or SAE-Standard J 1036, and on the other hand, flat plugs for uncoupling free of oil leaks.

Figure 5:
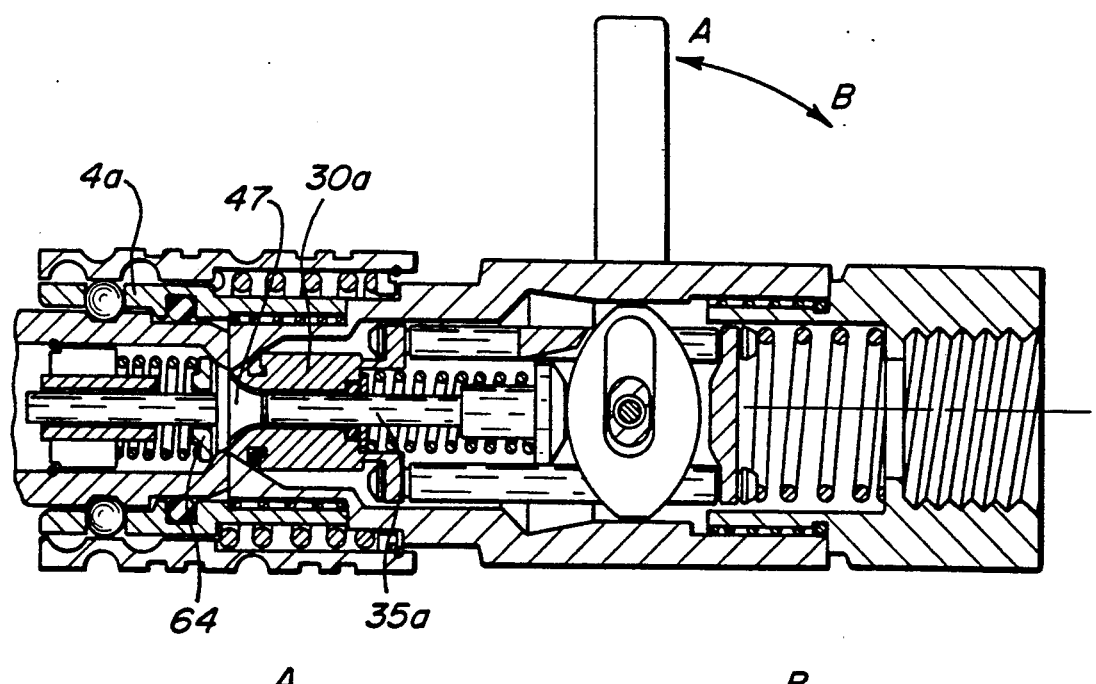
FIG. 5 is a longitudinal sectional view of a variation of the coupling for a second coupling part designed as a plug according to ISO- or SAE-Standards, with a corresponding contouring of the valve body of the first coupling part for receiving the continuation of the second valve.

In FIG. 5 a coupling of the same kind is shown, which is only suitable for the above mentioned standard-complying plug as a second coupling part, but not for flat valve plugs. In this embodiment of the invention recess 4a is constructed according to the known dimensions required by the Standards. The face side of valve body 30a of first valve 6 displays a crater-like depression, which approximates the negative contour of continuation 47 of second valve 64 of the second coupling part, which is formed as a plug. Actuator 35a is here shorter by the amount of the plug opening path than in the previously described construction examples. The mode of operation of the coupling is the same as the previously described one. Only, as was mentioned, a second coupling part constructed as a flat valve plug cannot be used. In this embodiment as well the amount of oil leakage during uncoupling is low, but does not have the low level, which the coupling according to the invention according to FIG. 1, 3 and 14 achieves with second coupling parts constructed as flat valve plugs.

Figure 6:
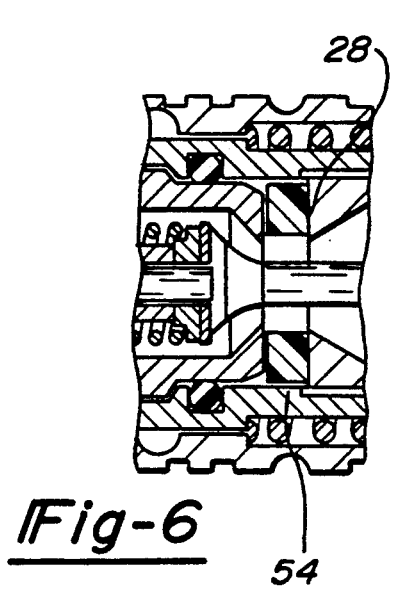
FIG. 6 is a detailed cross sectional view regarding a different embodiment of FIG. 2, in which a filler ring has been placed in the receiving space for the second coupling part.

FIG. 6 shows a solution for further reducing the amount of oil leakage during uncoupling of plugs complying with the Standards in the case of couplings according to the invention, with recesses which are equally suitable for second coupling parts, which are usable as flat valve plugs as well as plugs according to ISO-Standard 5675 or SAE-Standard J 1036. For the use of standard-complying plugs, a filler ring 54 of suitable material can be inserted between face surface 28 of housing 3 of the first coupling part and face surface 48 of the housing (FIG. 2) of the second coupling part. This filler ring 54 must, however, be removed when an adapted flat plug is to be connected. If the use of plugs according to ISO-Standard 5675 or SAE-Standard J 1036 is refrained from, then the elongation of the recess described is unnecessary. Then a dimension favorable to the second coupling part, constructed as a plug, and to the recess can be chosen.

Actuating shaft 7 includes the two shaft parts 8, 9. During the axial assembly of shaft parts 8 and 9 the end portion of flattened shaft end 13 of first shaft part 8 is inserted into a groove 14 of the second shaft part 9 in such a manner that a unitary actuating shaft 7 is generated according to FIG. 11.

Figure 9:
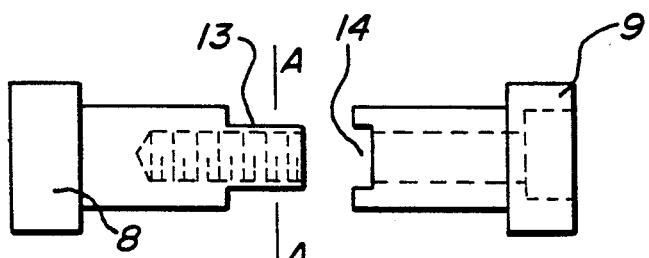
FIGS. 9–13 are views of the actuating shaft in detail in various cross-sections.
Figure 10:
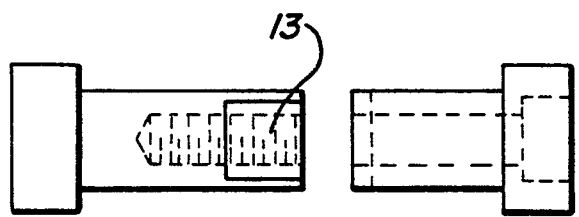
Figures 12, 13:
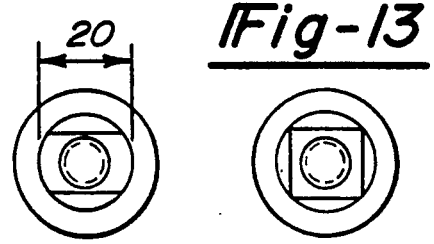

FIG. 12 shows a section along line 12—12 according to FIG. 9. Alternatively, instead of the flattened portion 13 of size 20 a square shape according to FIG. 13 can also be chosen. Also a polygonally contoured cross-section of this portion is possible (not drawn).

FIG. 14 shows a coupling with an axial-radial direction of flow for the pressurized medium. As already mentioned, the quick connect couplings with ball locks are favored for use as so-called quick disconnect couplings. This requires, however, that for most known couplings the locking sleeve must be installed at a fixed location and the housing must be slidable relative to it.

The connection of the pressurized medium to the housing must then, however, be flexibly movable, if an axial through flow of the pressurized medium occurs. This movable connection is for reasons of space not always feasible. For this reason the pressurized medium must flow through the housing in a radial direction if a quick disconnect coupling is desired. Also, it has become recent practice, to place several housings of the first coupling part in a block building pattern in a common housing.

For modern tractors it is not unusual to provide four or more coupling sleeves for the most diverse uses of hydraulic energy. According to FIG. 14, the second coupling part 2 configured as a plug, corresponds to the one of FIG. 1 and is not further discussed below. First valve 6, consisting of valve body 30a, carrier 29 with shafts 31 and face plate 32 and actuator 35, as well as actuating shaft 7, are equal in construction and function to those of the embodiments of FIG. 1, 3 and 4. They are, therefore, not discussed any further below.

Outer sleeve 75 is supported in a fixed location. Instead of this kind of sleeve, the recess for the first coupling part can also be a bore in the housing having the interior contour of sleeve 75. Several housings can be imagined which contain bores for several first coupling parts.

An inner sleeve 76 is provided for installation purposes and is supported at its face surface 77 at shoulder 78 of outer sleeve 75. At the other end, the inner sleeve 79 is held axially in place by safety ring 76 so that it is not slidable in outer sleeve 75 by safety ring 79. A seal 80 seals outer sleeve 75 against inner sleeve 76.

Circumferential locking ring 81, which retains locking balls 82 in locking groove 53 of plug 2, is made in one piece with inner sleeve 76.

For reasons of manufacturing and installation, the receiving housing part 83 is threadedly connected to housing 85 by means of a thread 84. However, it is also possible to make housing parts 83 and 85 in one piece.

A spring 86 acts in a known manner between housing parts 83 and 85, on the one hand, and sleeve parts 75 and 76 on the other hand in a known manner, so that sleeve parts 75, 76 and housing parts 83, 85 can be axially displaced relative to each other in each direction by a certain amount in order to open the ball-lock for connecting or disconnecting the second coupling part.

During coupling, coupling part 2, which is constructed as a plug, is pushed in direction B into the housing part forming the recess. Hereby, housing part 85 is displaced against the force of spring 86 against outer sleeve 75, equally in direction B. Housing part 85 and the housing part 83 forming the recess are sealed against outer sleeve 75 by seals 87 and 88.

After being pushed in direction B, locking balls 82 can escape outwardly into space 90 and second coupling part 2 can be pushed in a known manner into the recess. In this position, locking balls 82 can move aside into the locking groove of second coupling part 2 and locking occurs as soon as second coupling part 2 and thus the first coupling part as well are moved again by spring 86 in direction A until the spring is in the neutral position. In the neutral position of spring 86, the locking ring is positioned, as shown in FIG. 14, above locking balls 82.

For uncoupling, the second coupling part 2, which is configured as a plug, is pulled in direction A. Now housing 85 of the first coupling part is also pulled against the force of spring 86 against outer sleeve 75 in direction A. Locking balls 82 can escape outwardly to receptacle 89 and second coupling part 2 is released. Housing 85 moves independently by the force of spring 86 in direction B, again until the spring is neutralized.

For the radial through flow through the coupling at least one, but preferably several, crossbores 91 are distributed along the circumference of housing 85 and in outer sleeve 75 a annular groove 92 is provided. The continuing channel or line for the pressurized medium is connected to annular groove 92 (not drawn).

When the coupling is turned to "open" by turning handle 43a, during power transmission to a user, pressurized medium flows from annular groove 92 through crossbore 91 and the open valves 6, 64, from the first and second coupling part, axially through the second coupling part 2 toward the user, or in the opposite direction if the user must discharge pressurized medium.

In FIG. 15, a one piece configuration with locked rear face plate 32a is described instead of valve body 30 of the first valve. The carrier is composed of the four shafts 31 and rear face plate 32 according to FIG. 16, 17. This valve body includes a pair of slots 68 for actuating shaft 7, partial shaft pieces 8 and 9 and a pair of slots 69 and 69a, which is contemplated to be displaced by 90°, in which actuating member 18 is guided. Slot 69 is here shorter than slot 69a. This causes edge 71 to act as a stop for actuating member 18 and, therefore, this can likewise, as described above, not be actuated in the wrong direction.

However, a design according to FIG. 16 has shown itself to be particularly advantageous. Valve body 30 is connected to rear face plate 32 by four shafts 31, which together form carrier 29. Shafts 31 have a groove 73 at each end, by means of which they can each be inserted in the corresponding slot 74 (FIG. 17). The positioning of shafts 31 on valve body 30 and face plate 32 is contemplated to be rectangular in such a manner that the distance generated between the four shafts 31, between which a guide space 26 is created, can sometimes be wider and sometimes smaller. In this guide space 26, the head of actuator 35 is guided. Actuating member 18 is guided between the more closely spaced shafts 31 of carrier 29. The clearance volume generated by the larger spacing of shafts 31 serves to provide a through-passage of actuating shaft 7.

Shafts 31 are shown in the drawing with grooves 73, which each snap into slots 74 of valve body 30 and face plate 32. However, it is obviously possible to connect shafts 31 in other ways, for example by welding, soldering or threaded connections, with valve body 30 and face plate 32. FIG. 17 is a section along line 17—17 of FIG. 16. It clarifies stop 71, which is generated by bridge 70, with which two of the four shafts 31 are connected to each other.

Figure 18:
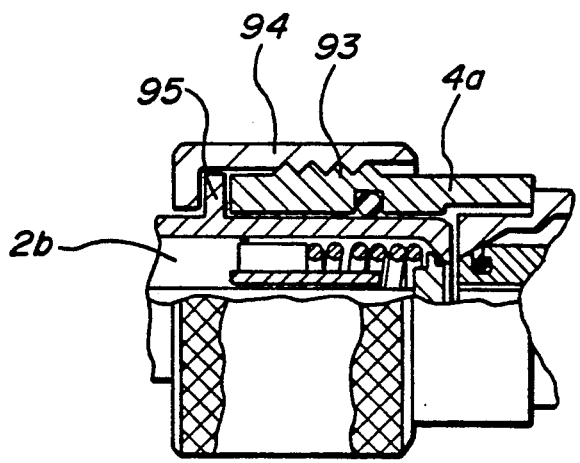
FIG. 18 is a plan view in longitudinal section of a design for connecting the second coupling part, which is constructed as a plug, by means of threaded coupling.

The first coupling part according to the invention can also be used with a recess, which is configured as a threaded connection for the second coupling part. FIG. 18 shows such an embodiment, where recess 4a is equally elongated in such a way that a second coupling part, configured as a flat valve plug, can be used as an alternative to such conical valves, which protrude from the face around the exit path, and is, therefore, free of leaks. Recess 4a is, in this case, equipped with an outer thread 93, to which swivel nut 94 can be threaded, and holds second coupling part 2b, which is configured as a plug, in recess 4a by means of shoulder 95. It is understood that a threaded connection can be used for all of the embodiments described above in the place of a ball check valve.

Figure 19:
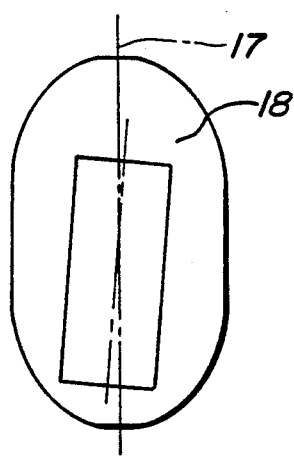
FIG. 19 is a schematic view of an alternative embodiment of the actuating member of FIG. 7.

The geometry of actuating member 18 can vary from the shape of an ellipse. The actuating member can also assume a basic rectangular shape with differently rounded corners and/or it can be provided with an elongated hole, which is placed at an angle to longitudinal axis 17. FIG. 19 shows an actuating member made in such a manner. Such configuration, which generate an actuating path deviating from 90° and possibly have a favorable effect on the required actuating force, can be so variable that they are not discussed further.

Under various conditions of use it is desirable that the coupling part, constructed as a plug, cannot be disconnected when the coupling has been actuated into the open position. For all described embodiments of the quick closing coupling according to the invention with axial locking (therefore, with the exception of the described embodiment as a threaded coupling) a locking feature can be designed relatively easily.

Figure 20:
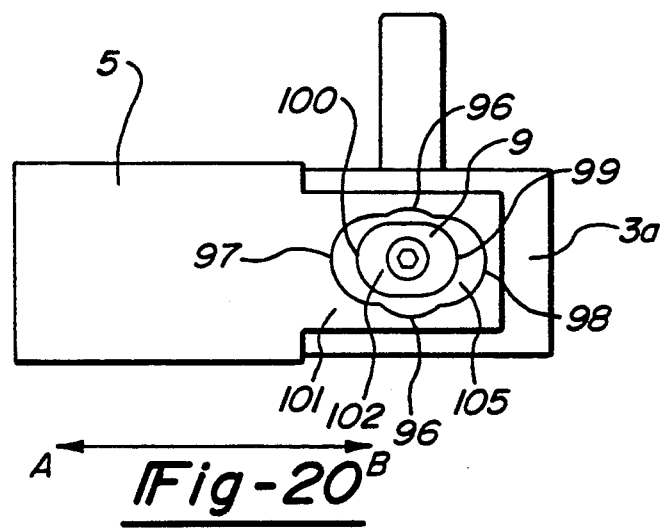
FIG. 20 is a plan view of an actuating shaft and a coupling sleeve based on the principle of blocking the locking bushing by means of the actuating shaft in the open position.
Figure 21:
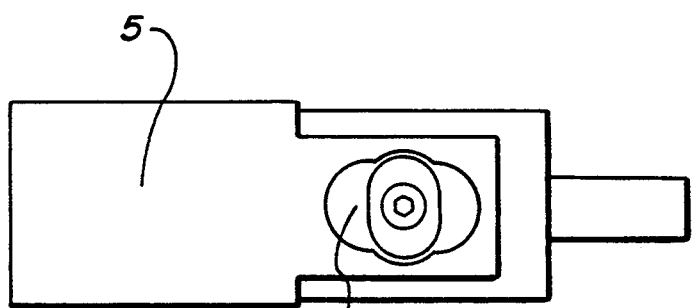
FIG. 21 is a plan view of the blocked position of the locking bushing according to FIG. 20.

In FIG. 20 and 21, a coupling with a coupling lock is shown schematically. Some reference numbers are taken from FIG. 1 or are being augmented to make it more understandable. Locking sleeve 5 includes an extension 101 extending past second shaft piece 9. Instead of the extension drawn, locking sleeve 5 can be elongated all over by a certain amount and thus envelop housing 3a of the first coupling part.

Applied to the embodiment of FIG. 14, a housing in a fixed position can also take the place of locking sleeve 5, where the housing of the first coupling part can move axially by a certain distance for making and breaking the connection.

FIG. 20 shows the coupling in an assumed closed-valve position and with a locking sleeve 5 in a fixed location.

Shoulder 102 of partial shaft piece 9 has an oval shape and, with the coupling closed, its longitudinal axis is disposed in an axial direction with respect to housing 3a of the first coupling part and thus in the direction of elongated hole 103 with two curved openings 96, which are located opposite each other in the center of the elongated hole. Elongated hole 103 is longer, in the axial direction, than the longitudinal axis of oval shoulder 96 on the partial shaft piece by twice the length of the path required for the actuating process. The widening of elongated hole 103 by curved openings 96 is dimensionally about equal to the longitudinal axis of shoulder 104.

In the neutral position of the coupling, which occurs when locking ring 81 (see FIG. 14, for example) is in the locking position around lock balls 82, or when spring 86 is in a neutral position, partial shaft piece 9 is located in the center of elongated hole 103. In it, when the coupling is closed, oval shoulder 102 of the partial shaft piece can now move axially in both directions, in each direction with the stroke necessary for coupling. The spacing between each of the two ends 97, 98 of elongated hole 95 and the opposite ends 99, 100 of shoulder 102 corresponds in each case to the coupling stroke. Coupling and uncoupling is, therefore, possible in the position of partial shaft piece 9 according to FIG. 20.

When the actuating shaft is rotated by 90°, then oval shoulder 102 is placed diagonally to the longitudinal direction of elongated hole 103 and enters, with its longitudinal axis, the curved spaces 96 of elongated hole 103. Now the sliding ability of housing 3a relative to locking sleeve 5 is blocked. The second coupling part 2, which has the shape of a plug, cannot be uncoupled. It is understood that the same function is achieved, if instead of locking sleeve 5, housing 3a is positioned in a fixed location and locking sleeve 5 is slidable by hand relative to housing 3a for coupling and uncoupling of the second coupling part 2. The coupling is secured in the described manner, so that it can be coupled or uncoupled only when the valve is closed.

Figure 22:
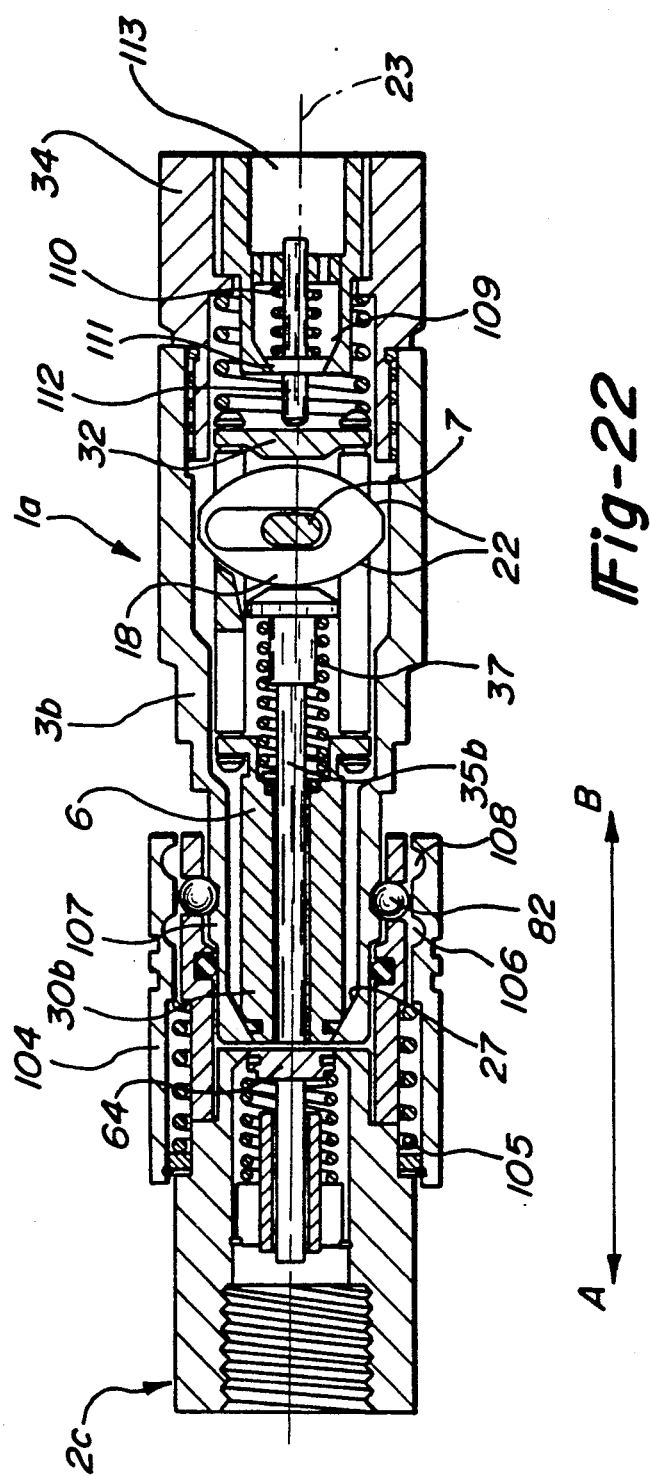
FIG. 22 is a longitudinal sectional view of a further embodiment of the coupling in its closed position, where the first coupling part is constructed as a sleeve and includes the actuating shaft and the second coupling part is constructed as a plug.

In FIG. 22, a further embodiment of a coupling with an actuating mechanism in accordance with the invention is shown. Here, first coupling part 1a, which embodies the actuating mechanism, is made as a plug. Second coupling part 2c of the coupling is constructed as a sleeve part. Such a coupling is preferably used where the first coupling part, which is used as a plug, is stationary, i.e. is installed in such a way that it cannot move, and the second coupling part, which is configured as a sleeve part, is movable. Here the coupling process of the two coupling parts 1a, 2c can be performed with one hand by grasping the movable second coupling part, which is constructed as a coupling sleeve, at the slide sleeve and pushing it against first coupling part 1a. Sliding sleeve 104 then moves against the force of spring 105 holding it in place, so that locking balls 82 can move out of the way. If one releases sliding sleeve 104, then it will once more be pushed by spring 105 into the locking position. If it is to be uncoupled, sliding sleeve 104 is pulled in the opposite direction out of the locking position and sleeve-shaped second coupling part 2b releases itself from plug-shaped first coupling part 1a. Such a coupling can be used to advantage anywhere where no classical quick disconnect coupling is to be used.

As can be further seen from FIG. 22, first coupling part 1a is constructed as the male part and accordingly equipped with a plug-like end. Second coupling part 2b is then constructed as a sleeve part with locking balls 82 which are held in the locking position by slide sleeve 104. First coupling part 1a is installed in a stationary location and second coupling part 2b is movable, then slide sleeve 104 moves relative to the housing of the first coupling part in direction B as soon as the plug-shaped end of first coupling part 1a pushes against locking balls 82 and slide sleeve 104 is pushed against the force of spring 105 further in direction B. Now locking balls 82 can move aside into first annular groove 106 in the interior surface of slide sleeve 104 until the plug-shaped end of first coupling part 1a is fully inserted into sleeve-shaped second coupling part 2b and locking balls 82 can snap into groove 107. If slide sleeve 104 is now released, then it will again be pulled in direction A by pressure spring 105 until it reaches a locking position, in which locking balls 82 can no longer escape to the outside. The coupling is now firmly connected. If second coupling part 2b is to be uncoupled from first coupling part 1a, then slide sleeve 104 is pulled in direction A. It moves against the housing of first coupling part 2b and against the force of pressure spring 105 in direction A until locking balls 81 can escape into second annular groove 108 in the interior surface of slide sleeve 104 and second coupling part 2b can be pulled away from first coupling part 1a.

Figure 4:
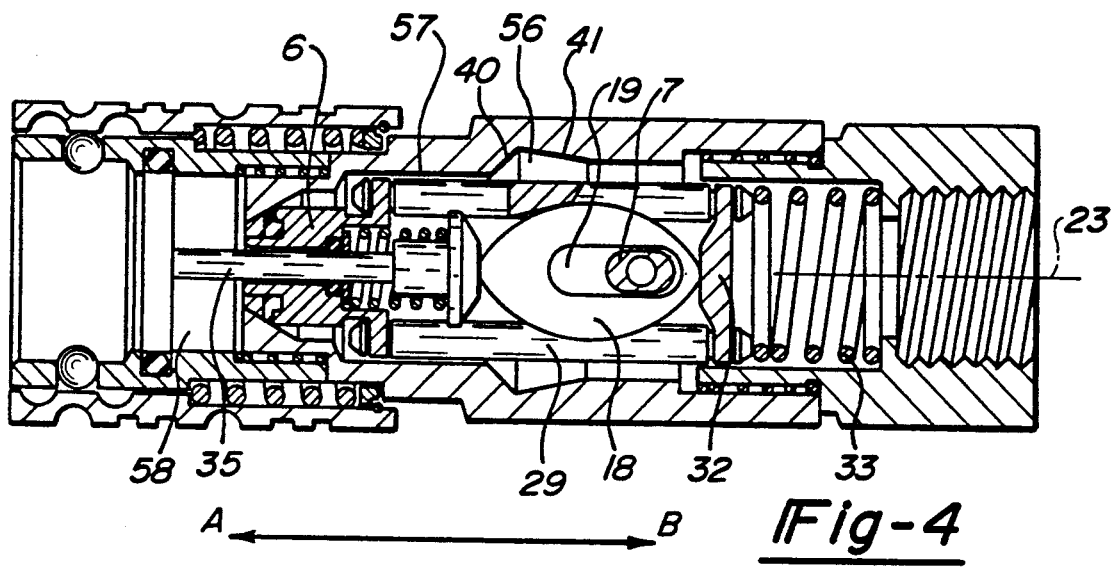
FIG. 4 is a longitudinal sectional view corresponding to FIG. 3, with the actuating shaft in the open position, but with a disconnected second coupling part and a closed first valve of the first coupling part.

It is also possible to install this embodiment of the coupling as a genuine quick disconnect coupling. In such a case, slide sleeve 104 shown in FIG. 4 is installed stationarily and coupling parts 2b and 1a are movable. Likewise, an embodiment is possible where a threaded coupling similar to the one of FIG. 18 is provided for connecting the two coupling parts 1a and 2b.

In connection 34 a check valve 109 is contemplated, which is spring loaded in direction A by spring 110. It is placed between line connection 113 and actuating member 18. Valve cone 111 of check valve 109 includes an actuator 112, both made of one piece, which extends close to face plate 32 of carrier 29, when the coupling is placed in the closed position. Check valve 111 is then also closed.

If now pressurized medium is introduced erroneously into connection 113, then it cannot get into coupling part 1a and thereby push actuator 35b out of housing 3b of first coupling part 1a.

If the coupling is now switched into the open position, then face plate 32 of carrier 29 will be pushed in direction B by actuating member 18. This then pushes against actuator 112, and check valve 109 will be opened.

It is to be understood that the shown embodiment of check valve 109 can also be varied. For example, actuator 112 can also be fastened to face plate 32 or designed to be of one piece with it, and push against valve cone 111 in order to open it. Also, a ball seat valve can be installed instead of valve cone 111.

While the above detailed description described the preferred embodiment of the present invention, the invention is susceptible to modification, variation, and alteration without deviating from the scope and fair meaning of the subjoined claims.

We claim:

1. A coupling for connecting hydraulic lines comprising:

a first coupling part having a first valve received in a housing of the first coupling part, means for receiving a second coupling part associated with said first coupling part, the second coupling part including a second valve adapted to couple with said receiving means, the first valve includes a valve body having a truncated cone shaped which is in a closing position against a cone-shaped sealing surface of the housing of the first coupling part, an actuator axially penetrating said valve body and adjustable relative to it in the direction of the second valve;

an actuating shaft disposed transversely to the first valve axis and penetrating the housing of the first coupling part, said actuating shaft acts upon said valve body of the first valve and valve actuator by way of an actuating surface, and said valve actuator is spring loaded by an opening spring supported at the valve body of the first valve for placement against the actuating surface, said actuating surface is a part of a separate actuating member, which is connected to the actuating shaft in a non-rotatable manner, said actuating shaft including at least two shaft parts, which are firmly but disengageably axially connected to one another, at least one end of the two shaft parts is non-rotatably connected to the actuating member in a form fitting manner, and the two shaft parts can be axially threadedly connected to each other.

2. The coupling according to claim 1, wherein the actuating member is non-rotatably supported between shaft parts of the actuating shaft with at least two cams opposite the actuating shaft and one cam of the actuating member moves the actuator toward the second valve and the second cam of the actuating member moves the first valve during a corresponding rotation of actuating shaft by an operating surface to the open position.

3. The coupling according to claim 2, wherein the actuating member is disposed axially between the operating surface and head surface of the actuator.

4. The coupling according to claim 2, wherein the operating surface is a part of a carrier to which the valve body of the first valve is attached and the closing spring exerts a force on the carrier.

5. The coupling according to claim 4, wherein the carrier forms a guide space, into which the actuator protrudes and in which the actuating member is pivotably received and which is penetrated by the actuating shaft disposed transversely to the valve axis.

6. The coupling according to claim 4, wherein the carrier includes shafts positioned on the valve body of the first valve and parallel to valve axis and a face plate attached to the shaft free ends, which included the operating surface located toward the actuating member and the actuating member is guided between the shafts.

7. The coupling according to claim 6, wherein at least two shafts are connected by a bridge, which is positioned in such a manner that it serves as a stop for the actuating member and thus determines the direction of rotation for the actuating shaft for opening and closing the first valve.

8. The coupling according to claim 1, wherein the shaft parts are axially connected by means of a screw.

9. The coupling according to claim 1, wherein the two shaft parts are centered with respect to each other at their ends which are directed toward each other and protruding into the housing of the first coupling part.

10. The coupling according to claim 2, wherein the actuating member is guided laterally between the two shaft parts.

11. The coupling according to claim 1, wherein at least one of the ends of the partial shaft parts protruding into the housing of the first coupling part is flattened or contoured.

12. The coupling according to claim 11, wherein the contoured end has an oval flat or a polygonal, particularly a rectangular or square, cross-section.

13. The coupling according to claim 11, wherein one end of one of the shaft parts is shaped as a male part and protrudes into a corresponding recess, shaped as a female part, of the second shaft part.

14. The coupling according to claim 1, wherein the shaft parts are provided with shoulders located outside the housing of the first coupling part, which, in each case, form a seating surface opposite a seal placed in a recess of the housing.

15. The coupling according to claim 1, wherein the actuating member is non-rotatably disposed by means of an elongated hole and permitting relative displacement with regard to actuating shaft.

16. The coupling according to claim 15, wherein the housing of the first coupling part in the vicinity of a bore, in which the actuating member experiences an axial displacement, contains a section in which the inner bore diameter is initially widened at a certain angle and then again reduced at another certain angle.

17. The coupling according to claim 1, wherein said actuating member is shaped as a disk and has an oval or elliptical basic shape having a major and a minor axis, the circumferential surface of which is shaped as an actuating surface.

18. The coupling according to claim 17, wherein the ends of the elliptical actuating member are flattened with regard to the major axis.

19. The coupling according to claim 18, wherein the major axis of the actuating member is longer than the minor axis by at least the sum of the opening paths of the second valve and the first valve.

20. The coupling according to claim 18, wherein the actuating member has an elongated hole on its major axis, by means of which it is non-rotatably but adjustable in the direction of the major axis, on the actuating shaft, which is equipped with two parallel guide surfaces.

21. The coupling according to claim 19, wherein the elongated hole in the actuating member is disposed in a position that it is displaced in the direction of its major axis in a direction from the center line to an off-center-line position.

22. The coupling according to claim 1, wherein the valve body of the first valve is equipped with a tube-shaped projection which is provided with two pairs of slots, which are extended in an axial direction, where actuating shaft is guided through the first pair of slots and actuating member through the second pair of slots.

23. The coupling according to claim 22, wherein the direction of rotation of the actuating shaft is predetermined by the fact that one of the second slots of the second pair of slots, which guide the actuating member is shorter than the other.

24. The coupling according to claim 1, wherein the valve body of the first valve is spring-loaded in the direction of the closed position by a separate closing spring, which is supported at the housing of the first coupling part or a part connected to it, and that the actuating surface of the first valve is provided with a free play to the operating surface for the movement of the valve body of the first valve into the opening position.

25. The coupling according to claim 24, wherein the actuating member is movable in the opening position in the direction of valve axis by at least the valve stroke length of valve body of first valve, which is augmented by the size of the free play from the closed position to the open position relative to actuator shaft.

26. The coupling according to claim 1, wherein the actuator, in order to open the second valve, is moved beyond the face of the housing of the first coupling part by at least the opening distance of the second valve into the receiving space of receiving part of the first coupling part.

27. The coupling according to claim 1, wherein the distance between the hole-circle of the locking balls and the face of the housing of the first coupling part is of such a magnitude that the valve parts, which protrude from the face of the second coupling part, when connected and with the first valve and second valve closed, do not extend beyond fact in the direction of the first valve.

28. The coupling according to claim 1, wherein the receiving means part of first coupling part is configured for a second coupling part which can be threadedly connected by means of a swivel nut.

29. The coupling according to claim 1, wherein a filler-ring is placed between a face of the second coupling part and face of the first coupling part.

30. The coupling according to claim 1, wherein the second valve in its closed position does not extend beyond the face of the second coupling part.

31. The coupling according to claim 1, wherein a pilot-controlled check valve is coupled to the first coupling part, and said pilot-controlled check valve can, during movement of the actuating member to the open position, likewise be moved into the open position.

32. The coupling according to claim 31, wherein the check valve may be actuated by the carrier under load by way of the actuator member.

33. The coupling according to claim 1, wherein the first coupling part is formed as a coupling sleeve and the second coupling part as a coupling plug.

34. The coupling according to claim 1, wherein the first coupling part is formed as a coupling plug and the second coupling part as a coupling sleeve.

* * * * *